US009506226B2

(12) United States Patent
Walters

(10) Patent No.: US 9,506,226 B2
(45) Date of Patent: Nov. 29, 2016

(54) WATER COLLECTION TANK AND FILTERING SYSTEM

(75) Inventor: Arnold Bruce Walters, Austin, TX (US)

(73) Assignee: Senox Corporation, Austin, TX (US)

( * ) Notice: Subject to any disclaimer, the term of this patent is extended or adjusted under 35 U.S.C. 154(b) by 626 days.

(21) Appl. No.: 13/608,566

(22) Filed: Sep. 10, 2012

(65) Prior Publication Data

US 2014/0069929 A1    Mar. 13, 2014

(51) Int. Cl.
| | |
|---|---|
| *E03B 3/03* | (2006.01) |
| *B01D 35/027* | (2006.01) |
| *B01D 29/88* | (2006.01) |
| *B65D 25/04* | (2006.01) |
| *B65D 90/02* | (2006.01) |

(52) U.S. Cl.
CPC ............... *E03B 3/03* (2013.01); *B01D 29/88* (2013.01); *B01D 35/0276* (2013.01); *B65D 25/04* (2013.01); *B65D 90/02* (2013.01)

(58) Field of Classification Search
CPC ............ B01D 29/0009; B01D 29/0018; B01D 29/0097; B01D 29/88; B01D 29/90; B01D 29/92; B01D 35/027; B01D 35/0273; B01D 35/0276; B01D 39/10; B01D 2221/12; B01D 29/904; B01D 29/906; B65D 25/04; B65D 25/38; B65D 88/02; B65D 90/02; B65D 90/0066; B65D 90/08; E03B 3/02; E03B 3/03; E03B 11/02
USPC ............ 210/154, 162, 257.1, 456, 459, 460, 210/497.01, 498, 464–482; 220/565, 4.12, 220/500, 501, 553, 555; 52/192, 196
See application file for complete search history.

(56) References Cited

U.S. PATENT DOCUMENTS

| | | | | |
|---|---|---|---|---|
| 967,905 | A * | 8/1910 | Hagg | B01D 17/045 210/209 |
| 1,559,941 | A * | 11/1925 | Demaree | 210/422 |
| 1,609,867 | A * | 12/1926 | Eisenhauer | 210/257.1 |
| 1,861,481 | A * | 6/1932 | Rabjohn | B01D 23/02 210/123 |
| 2,679,253 | A * | 5/1954 | Carson | A47L 15/16 134/104.4 |
| 3,312,353 | A * | 4/1967 | Rosaen | B01D 35/005 137/549 |
| 3,481,476 | A * | 12/1969 | Taylor | B01D 17/045 210/335 |
| 4,261,823 | A * | 4/1981 | Gallagher et al. | 210/164 |
| 5,223,136 | A * | 6/1993 | Gilbert | 210/315 |
| 5,433,845 | A * | 7/1995 | Greene et al. | 210/170.03 |
| 5,562,819 | A * | 10/1996 | Turner et al. | 210/85 |

(Continued)

FOREIGN PATENT DOCUMENTS

WO        2010022704 A2     3/2010

*Primary Examiner* — Joseph Drodge
(74) *Attorney, Agent, or Firm* — J. Scott Denko; Denko & Bustamante LLP

(57) ABSTRACT

A water collection structure comprises within it first and second sub-chambers and at least one water collection chamber. The first sub-chamber is at least partially bounded by a wall and has extending from it a water input guide configured and arranged to direct water toward a portion of the wall of the first sub-chamber. The second sub-chamber is open to the first sub-chamber and configured to accept a filter. The second sub-chamber is open to a conduit configured for the carriage of water from the second sub-chamber to an output port of the water collection tank. In use a filter disposed in the second sub-chamber preferentially filters water from the first sub-chamber such filtered water being deflected by the wall of the second sub-chamber to fall into the water collection chamber while the debris laden waste water falls out the lower part of the filter into the conduit.

11 Claims, 6 Drawing Sheets

(56) References Cited

U.S. PATENT DOCUMENTS

| | | | |
|---|---|---|---|
| 5,788,848 A * | 8/1998 | Blanche et al. | 210/162 |
| 5,858,232 A * | 1/1999 | Meissner | B01D 24/04 |
| | | | 210/450 |
| 6,264,832 B1 * | 7/2001 | Panahi | 210/127 |
| 6,287,459 B1 * | 9/2001 | Williamson | 210/99 |
| 6,797,161 B2 * | 9/2004 | Use et al. | 210/131 |
| 7,014,759 B2 * | 3/2006 | Radford | C02F 1/003 |
| | | | 141/330 |
| 7,138,048 B1 * | 11/2006 | O'Connor et al. | 210/136 |
| 7,441,665 B2 * | 10/2008 | Bridges | C02F 1/50 |
| | | | 210/232 |
| 7,497,234 B2 * | 3/2009 | Robinson | 138/44 |
| 7,875,190 B2 * | 1/2011 | Pank | 210/747.3 |
| 8,778,175 B2 * | 7/2014 | Caldwell | C02F 1/003 |
| | | | 210/151 |
| 2003/0085169 A1 * | 5/2003 | Reid | B01D 24/005 |
| | | | 210/435 |
| 2007/0241052 A1 * | 10/2007 | Swift | 210/532.1 |
| 2012/0267314 A1 * | 10/2012 | Minton-Edison | C02F 1/002 |
| | | | 210/695 |

\* cited by examiner

WATER COLLECTION TANK AND FILTERING SYSTEM

TECHNICAL FIELD

The present invention relates to water collection and, in particular, to a water collection structure that employs a filter within the water collection structure.

BACKGROUND OF THE INVENTION

Rainfall is intermittent and variable. Sometimes rainfall variations are regular with the seasons. In other instances, rainfall fluctuates over longer periods of time. The variability of rainfall has forced man to develop systems to collect water when available to provide water when rain is scarce.

In a more contemporary perspective, water supplies, particularly in the Southwestern United States have come under particular pressure arising from increasing populations and what appears to be increasing rainfall variability.

In response to rainfall variability, the collection of rain has been undertaken for centuries. Cisterns were used in the classic era to hold rainwater collected from roofs and more recently, rain collection receptacles such as rain barrels have been located in suburban neighborhoods. These are found with increasing frequency throughout the Southwestern United States to supplement local supplies at reasonable cost.

The water collected from rainfall, either through especially constructed collection systems or from structures such as roofs, for example, will typically include unwanted material washed into the collection systems and receptacles. Without some sort of filtration or selection system, vegetative matter such as leaves and twigs along with animal waste such as bird droppings, will frequently wash into the storage receptacles of water collection systems.

Consequently, a variety of filtration systems have been developed to inhibit the collection of unwanted material and waste in rain collection systems. Such systems have used a variety of techniques such as direct filtration through mesh or fiber screens while other systems have used cyclonic or circulatory action to assist the passage of higher quality water through filters while leaving the more debris laden water for differential collection.

In each case, however, the filtering system has added complexity and unsightly apparatus to filtration systems. This is of particular concern in residential installations where rain barrels are increasing in use. Most available filtration systems add visible plumbing and unsightly complexity to what should preferably be utilitarian and unobtrusive installations whether devised to enhance the water supply for residential water users while lowering the load on the neighborhood or city supply facilities or providing water supplies in locations far removed from established supplies.

What is needed therefore is a filtration system devised to remove substantial amounts of unwanted debris and residue from rain water before collection for later use while minimizing the visibility of the filtration apparatus.

SUMMARY OF THE INVENTION

A water collection structure includes first and second sub-chambers and at least one water collection chamber. A water inlet and the first sub-chamber are configured to impart rotational motion to inlet water. A second sub-chamber exhibits an opening to the first sub chamber. An open-ended filter is disposed into the opening of the second sub-chamber. The filter has an at least partially water-permeable wall that inhibits passage of debris from circulating water passing to the second sub-chamber from the first sub-chamber. The water to which rotational motion has been imparted preferentially passes through the permeable walls of the filter and is deflected by the wall of the second sub chamber to descend to the rain collection chamber. Debris-laden water and the debris that do not pass through the permeable wall of the filter pass through the lower open end of the filter into a conduit that carries the debris and associated waste water to an exit port of the water collection tank. In a preferred embodiment, the wall of the second sub-chamber acts as a deflection wall and deflects the water passed through the filter toward the outer perimeter of the conduit which is smooth to provide for the water a capillary path into the water collection chamber thus inhibiting eddy currents that could otherwise result from the water passing through the filter falling directly into the collection chamber.

DETAILED DESCRIPTION OF PREFERRED EMBODIMENTS

Figure 1:
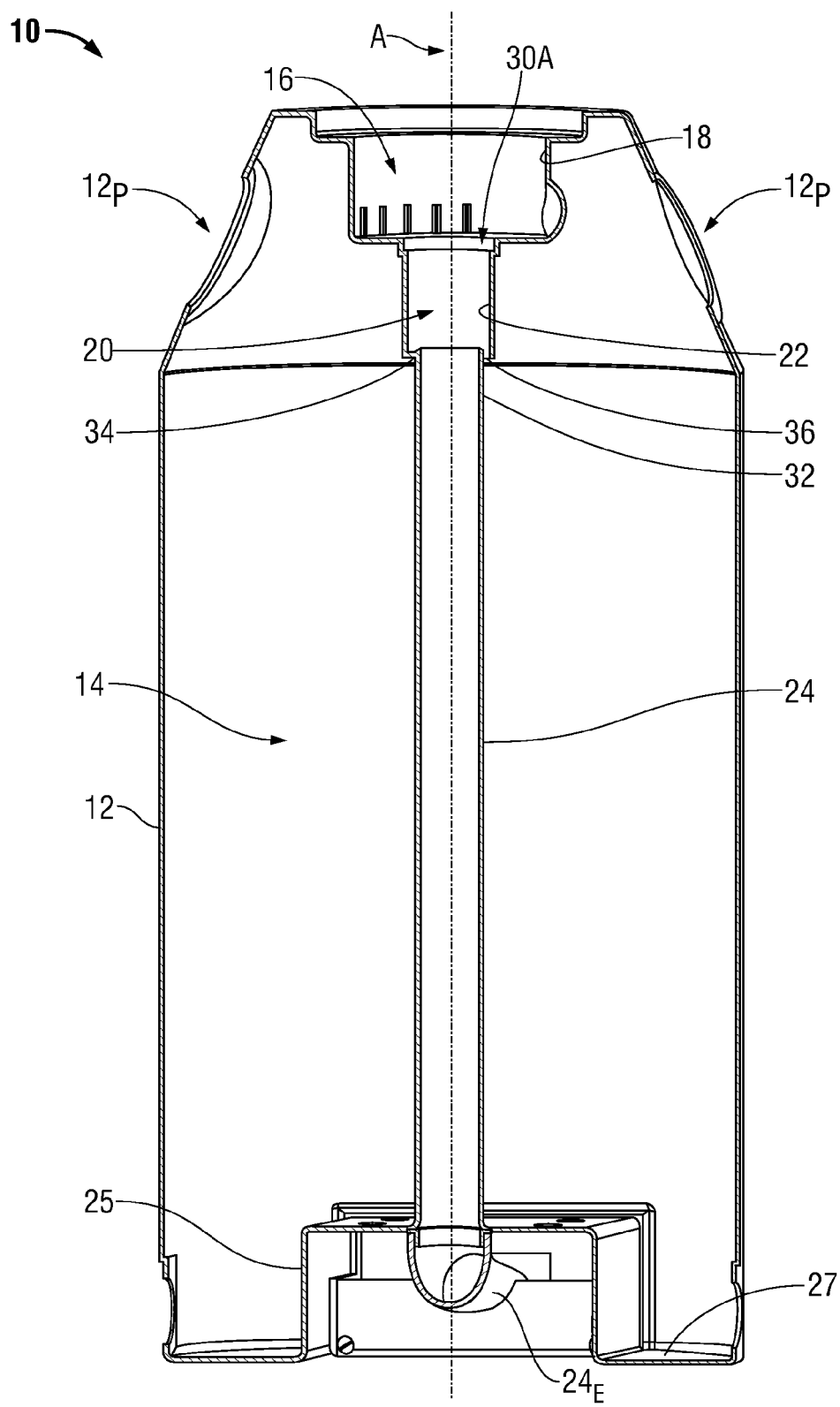
FIG. 1 depicts a cutaway view of a water collection structure in accordance with a preferred embodiment of the present invention.

FIG. 1 is a cross-sectional depiction a water collection structure 10 in accordance with a preferred embodiment. As those of skill will readily recognize, structure 10 may be called in the art a "tank" or "barrel" depending on its capacity. For purposes of this exposition, however, it should be understood that the term "tank" may, from time to time, be employed without any implication that a size limitation is imposed by use of that shorthand term for water collection structure 10.

Water collection structure ("tank") 10 has outer wall 12 with optional inspection ports 12p. Although shown as a cylindrical structure, tank 10 may take on a variety of shapes prismatic, squared, spherical and/or various cylindrical configurations. Tank 10 comprises a water retention chamber 14, first sub-chamber 16 with wall 18 and a second sub-chamber 20 with wall 22 and conduit 24. Optional accessory chamber 25 is shown at the floor of tank 10. Conduit 24 is shown having an exit portion 24E concealed in chamber 25 but as those of skill will recognize after appreciating this disclosure, conduit 24 can take a variety of paths and be comprised of a variety of portions or sections. Preferably, first sub-chamber 16 and second sub-chamber 20 and conduit 24 along particularly its upper length, are aligned along an imaginary axis shown with dotted A line through tank 10. They need not be so aligned but such alignment is preferred.

Water collection structure 10 is typically comprised from structurally sound plastic but it may be configured from a variety of materials with or without a supporting frame as determined to be appropriate for the capacity of water to be held and the available fabrication methods. As those of skill will recognize after appreciating this disclosure, the elements of water collection structure 10 may be fabricated in individual elements or sub-structures or in some cases all at once or other ways convenient for whatever fabrication process is employed. One preferred mode of fabrication employs the process of roto-molding allowing the fabrication of complex functional configurations at reasonable expense. Other more complex modes of mold-based fabrication may also be employed as those of skill will recognize.

Figure 2:
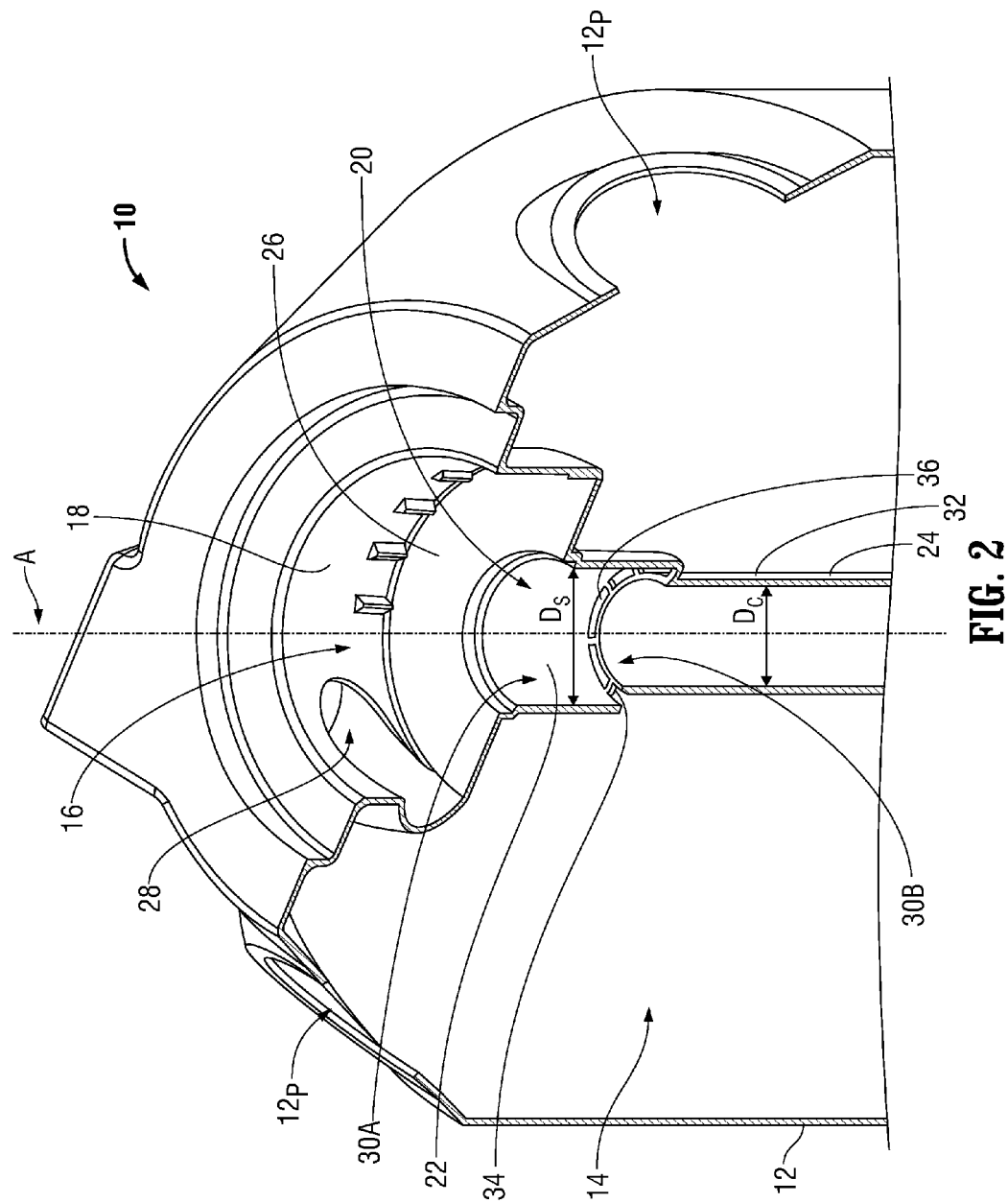
FIG. 2 is an enlarged perspective cutaway view of the upper part of the embodiment of the rain collection structure shown in FIG. 1.

FIG. 2 is an enlarged cutaway perspective of the upper part of water collection structure 10. First sub-chamber 16 shown within tank 10 is depicted as being cylindrical in configuration. First sub-chamber 16 may, however, take on a variety of configurations such as, for example, a bowl or other container having any of a variety of linear or non linear walled shapes. Thus, as should be apparent, depicted floor 26 is not required for first sub-chamber 16. Water inlet guide 28 guides water into first sub-chamber 16 and is configured so as to impart to entering water a rotational motion that preferably persists about sub-chamber 16. That motion is encouraged by the configuration of first sub-chamber 16 having, for example, a wall 18 configured to exhibit an arcuate shape such as is shown in FIGS. 1 and 2. The orientation of water inlet guide 28 relative to the axis A of first sub-chamber 16 preferably assists in imparting rotational motion to entering water.

Second sub-chamber 20 has open ends 30A and 30B and wall 22. As shown in FIGS. 1 and 2, second sub-chamber 20 is disposed beneath first sub-chamber 16 and preferably along coincident axis A. Second sub-chamber 20 is disposed so as to present open end 30A to first sub-chamber 16 to allow the passage of water from first sub-chamber 16 to second sub-chamber 18. The rotational motion imparted to the water tends to persist and particularly if aligned about common axis A allowing water rotating about first sub-chamber 16 to be induced to fall by gravity into second sub-chamber 20 while still retaining at least a part of its rotational motion. Various combinations of water inlet guide configurations in cooperation with the configuration of first and second sub-chambers 16 and 20 respectively can be devised to manage the degree of rotational motion imparted to entering water. Further, if the upstream collection system that provides water to tank 10 collects a large volumetric flow of water added velocity may be imparted to the water flow, thus encouraging increased velocity in water entering tank 10 and, therefore, enhanced circulatory action by the combination of water inlet guide 28 and first sub-structure 16 of tank 10.

Second sub-chamber 20 includes wall 22 which operates as a deflector to water emerging from the sides of a filter inserted into second sub-chamber 20 of tank 10 as will be later explained and shown with reference to later FIGS. 4 and 5. Conduit 24 is disposed to receive water flow from second sub-chamber 20 and has outer wall 32 which in some preferred embodiments is smooth. In the depicted embodiment, the outer diameter $D_c$ of conduit 24 is less than the inner diameter $D_s$ of second sub-chamber 20.

Second sub-chamber 20 is shown as being connected to conduit 24 by tangs 34 but those of skill will recognize that a variety of modes may be employed to dispose conduit 24 in relation to second sub-chamber 20 depending on the various modes of fabrication chosen for water collection structure 10. With continuing reference to FIG. 2, slots 36 are visible between second sub-chamber 20 and conduit 24 at the perimeter of opening 30B of second sub-chamber 20.

Figure 3:
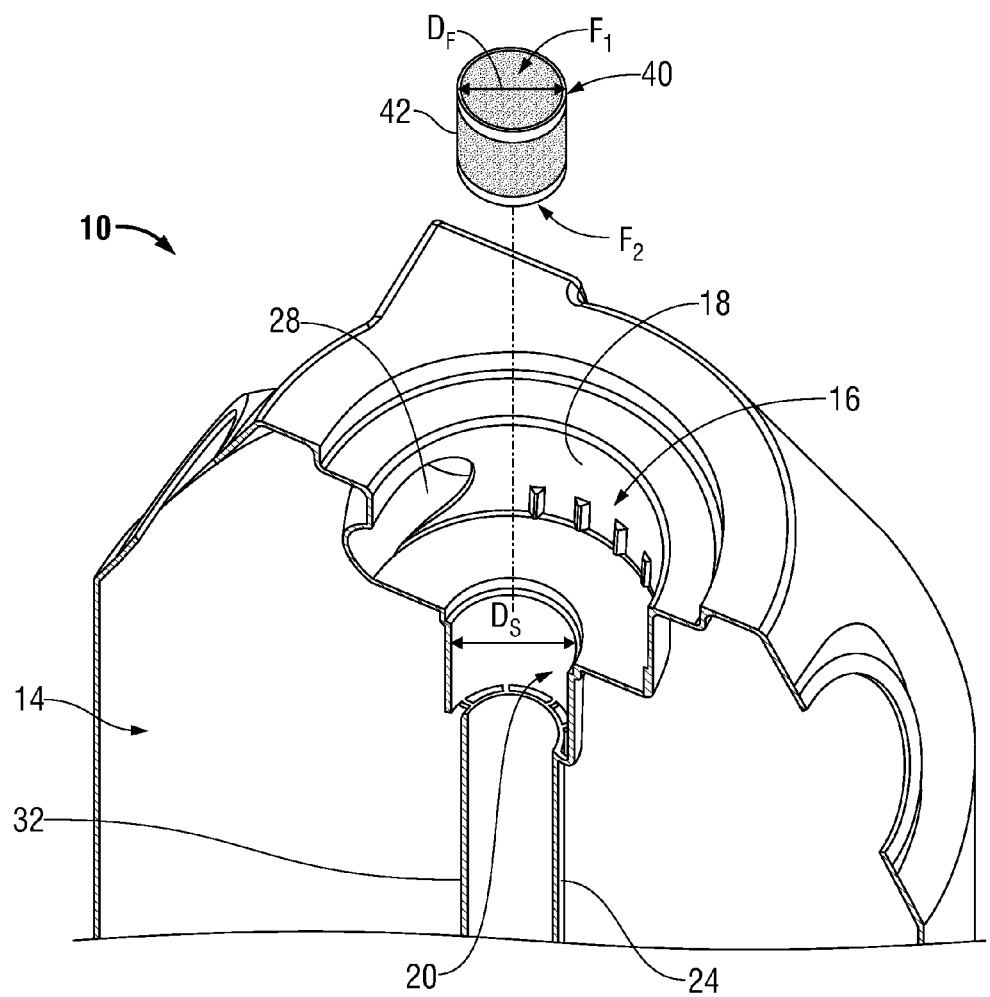
FIG. 3 depicts the area shown in FIG. 2 showing the disposition of a filter within the rain collection structure embodiment.

FIG. 3 depicts the disposition of filter 40 into second sub-chamber 20. Filter 40 has an outer diameter $D_f$ which is smaller than inner diameter $D_s$ of second sub-chamber 20. Filter 40 is preferably cylindrical in configuration although it could partake of other shapes, and it has open ends $F_1$ and $F_2$. Filter 40 is bounded by filter material 42 disposed about its circumference. Filter material 42 is preferably a two stage metallic screen constructed from corrosion resistant metallic material but at those of skill will recognize after appreciating this disclosure, filter material 42 made by comprised of a variety of materials including certain plastics and synthetic or natural materials in addition to metallic material and may have any number of layers.

Figure 4:
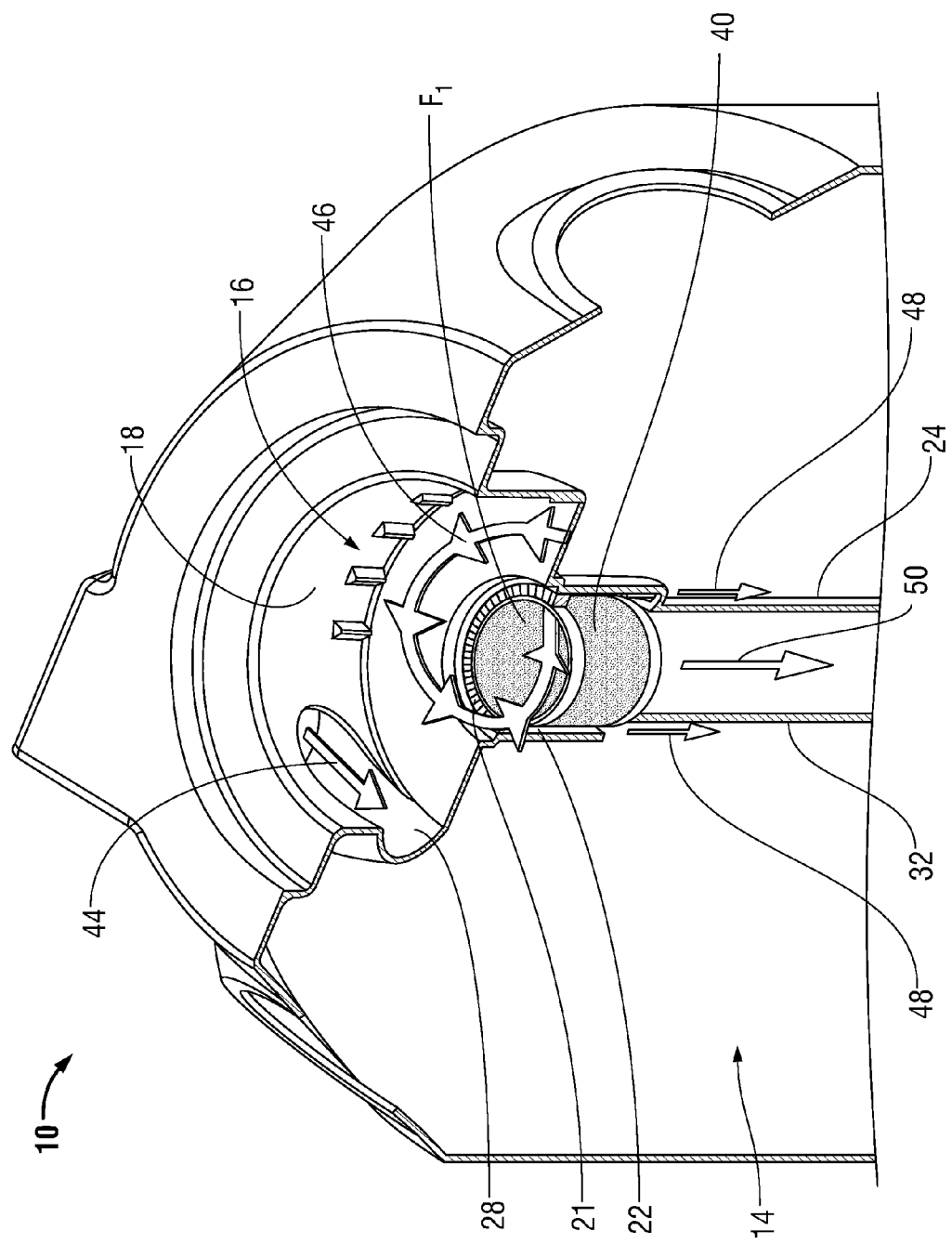
FIG. 4 depicts the area of the embodiment shown in FIG. 2 but with a filter placed in the structure and exemplified water flow represented by arrows.

FIG. 4 is an enlarged depiction of the upper part of water collection structure 10 with filter 40 disposed in place into second sub-chamber 20. FIG. 4 depicts a gasket 21 between filter 40 and second sub-chamber 20. Gasket 21 may be part of filter 40 or a part of water collection structure 10 or a separate piece but it is to inhibit the passage of water so that it falls down opening $F_1$ of filter 40 when water collection structure 10 is in operation. Gasket 21 may be comprised of any material that provides a water inhibiting seal. FIG. 4 includes various arrows to depict the flow of water when tank 10 is in use collecting water. As shown in FIG. 4 by arrow 44, water enters water input guide 28 to enter first sub-chamber 16. From its angle of attack, the entering water tends to circulate about first sub-chamber 16 as shown further in its path by arrow 46 that represents the circulatory or cyclonic water flow in a preferred embodiment.

As the water circulates, it tends by the force of gravity to coincidentally fall toward second sub-chamber 20 whose opening 30A (shown in earlier FIG. 2) is now filled by filter 40 and gasket 21. Consequently, flows through opening $F_1$ of filter 40 into the interior of filter 40 while its persisting circulatory motion impels the water against the inside of filter material 42 of filter 40. As the water tends toward the inner side of filter material 42 (e.g., a screen), at least a portion the water is filtered by filter 40 and continues out of the filter (as shown by arrows 47 in subsequent FIG. 5) outward from the central axis A toward wall 22 of second sub-chamber 20.

Figure 5:
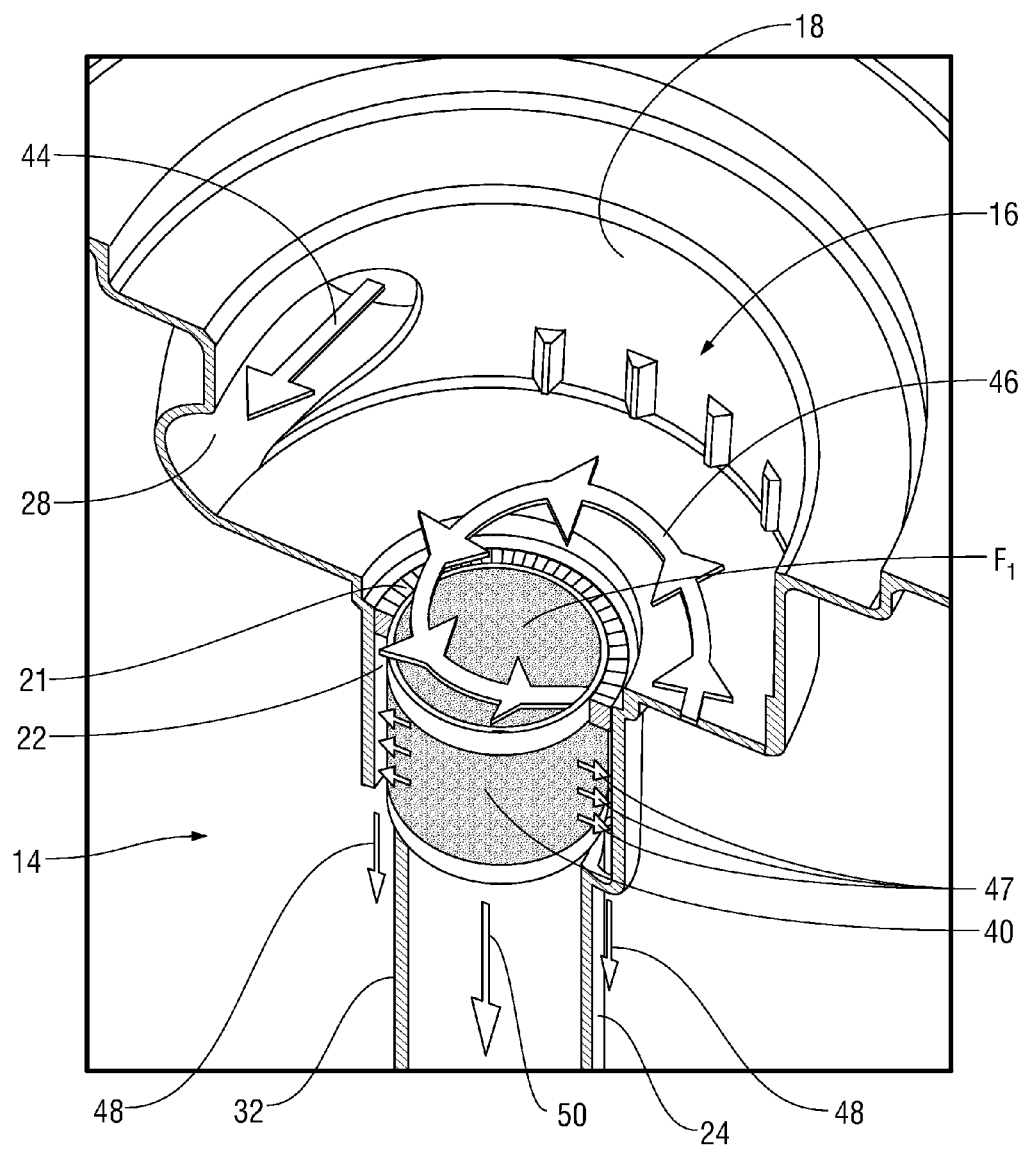
FIG. 5 is an enlarged depiction of a portion of the water collection structure embodiment with a filter in place that is shown in FIG. 4.

Wall 22 acts as a deflector to the filtered water emergent from filter 40 tending to cause that water to fall by gravity between filter 40 and deflection wall 22 through gaps 36 (shown in earlier FIG. 2) as shown by flow arrows 48 in FIGS. 4 and 5. As those of skill will appreciate after understanding this disclosure, if conduit 24 has an appropriate outer wall 32 of smooth aspect, the water flow 48 will, at least in part, tend to follow the outer wall 32 as it descends into water accumulation chamber 14. Thus, disturbance of the already accumulated water in chamber 14 tends to minimized as water is added to the accumulation.

If water flow 46 into filter 40 is laden with debris, filter 40 inhibits passage of such debris laden water out through filter material 42 and that waste water tends to fall out the lower opening $F_2$ of filter 40 which is open to conduit 24 down into the inner path of conduit 24 as depicted by flow arrow 50.

FIG. 5 is an enlarged depiction showing in greater magnification the exemplar flows of water in tank 10 as collection is underway.

Figure 6:
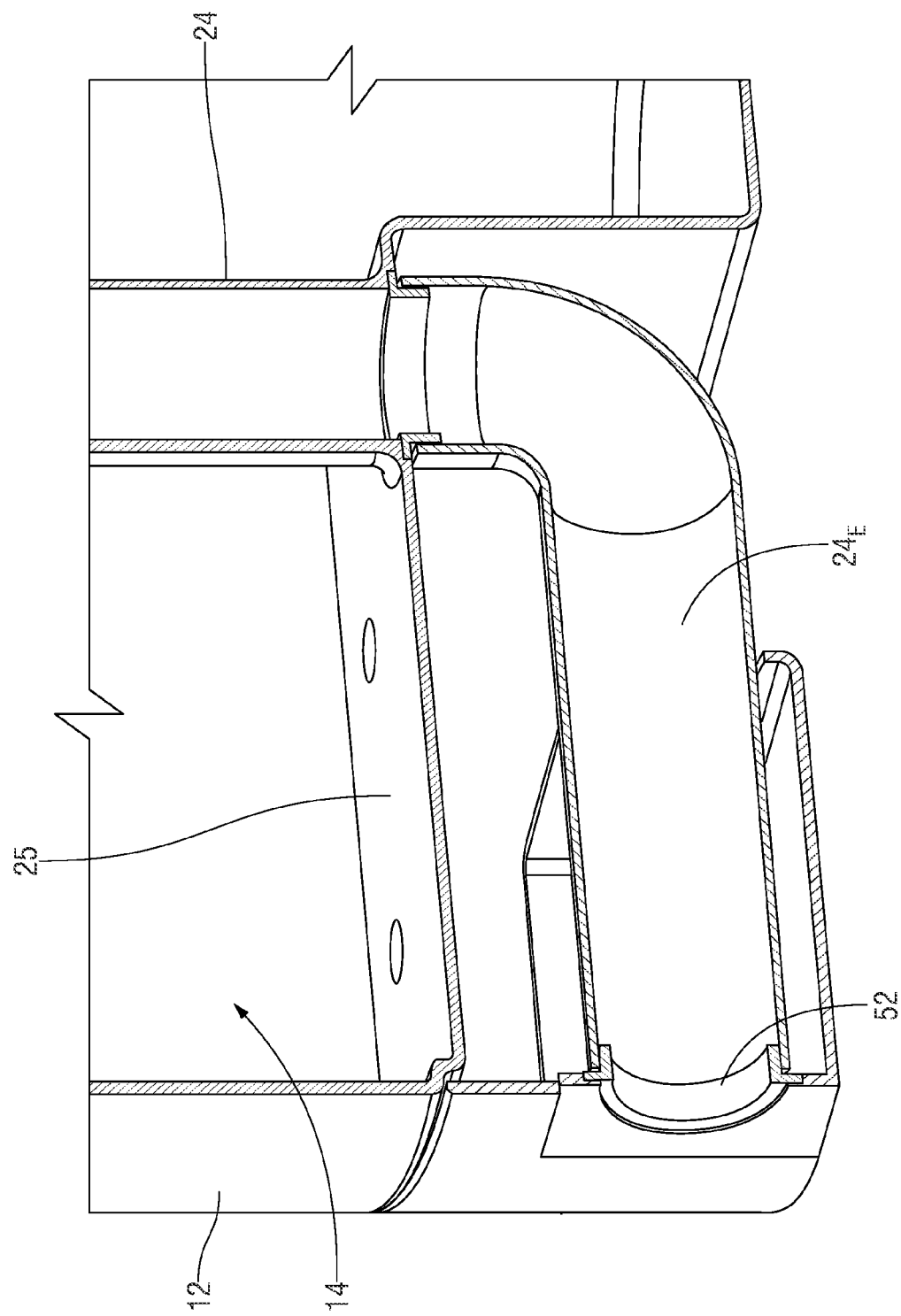
FIG. 6 depicts the path of an exemplified conduit and its path exiting a water collection structure in accordance with a preferred embodiment.

FIG. 6 is an enlarged depiction of the passage of conduit 24 toward exit port 52 of tank 10 in a preferred embodiment.

As shown, exit portion 24E of conduit 24 is substantially concealed by accessory box 25 but as those of skill will recognize, box 25 can be dispensed with and conduit 24 merely brought to exit port 52 directly without concealment or a special exit portion such as 24E. Water flow 50 depicted in earlier FIG. 4 passes down conduit 24 and flows out exit port 52. Exit port 52 may be fabricated by use of spin weld techniques to provide a sound structural fitting for subsequent connection of hoses or other water management devices on the outside of tank 10. Exit port 52 may be threaded or fitted with any of a variety of fittings appropriate for the subsequent management of the waste water flow from conduit 24. As those of skill will recognize, the inclusion of accessory box 25 can allow additional control devices for pumps or lights or other accessories within the footprint of tank 10 thus further enhancing the visual simplicity and utility provided by the consolidated (i.e. when used with internal filter) structure provided by tank 10.

I claim:

1. A gravity operated filtering water collection tank and filtering system comprising first and second sub-chambers and at least one water collection chamber, the at least one water collection chamber being configured to store water, the first and second sub-chambers and the at least one water collection chamber all disposed within the water collection tank, the disposition of the first and second sub-chambers being axially above one another, the first sub-chamber having a first sub-chamber deflection wall, the first sub-chamber configured for reception of water from a water input guide configured and arranged so as to urge water introduced into the first sub-chamber from the water input guide toward a portion of the first sub-chamber deflection wall of the first sub-chamber, the second sub-chamber being open to the first sub-chamber and disposed in relation to the first sub-chamber so that water from the first sub-chamber will flow into the second sub-chamber and the second sub-chamber being configured with a second sub-chamber deflection wall, the water collection tank and filter system further comprising an exit conduit and a filter disposed at least in part in the second sub-chamber, the filter having a filter wall comprised from filter material at least partially permeable to water, the filter having first and second filter openings and being disposed in the second sub-chamber so as to receive through the first filter opening, water from the first sub-chamber and the filter wall disposed in relation to the second sub-chamber deflection wall to allow water filtered through the filter wall to fall into the at least one water collection chamber and unfiltered water to pass from the second filter opening to the exit conduit.

2. The gravity operated filtering water collection tank and filtering system of claim 1 further comprising an exit port that is an extension of the exit conduit and which emerges from the water collection structure.

3. A gravity operated filtering water collection tank and filtering system comprising:
  a water accumulation chamber, a first sub-chamber and a second chamber disposed in axial relationship with the first sub-chamber and both sub-chambers and water accumulation chamber being disposed within the water collection tank;
  the first sub-chamber having a water inlet guide configured to pass water into the first sub-chamber;
  the second sub-chamber configured to accept and comprising a cylindrical filter, the cylindrical filter being structured with first and second open ends and a filtering wall comprising filter material, the first open end of the filter being disposed to accept water from the first sub-chamber and the second open end of the filter being configured to pass unfiltered water to an exit conduit of the tank and filter through its filtering wall, a portion of the water accepted from the first filter end.

4. The gravity operated filtering water collection tank and filtering system of claim 3 in which the conduit is further configured with a smooth outer wall.

5. The gravity operated filtering water collection tank and filtering system of claim 3 in which an exit port that is an extension of the exit conduit is spun-welded to become an integral piece of the water collection tank.

6. The gravity operated filtering water collection tank and filtering system of claim 3 in which the second sub-chamber includes a deflection wall configured to direct water exiting the filtering wall to the outside of the exit conduit itself but still inside ef the water accumulation chamber.

7. The gravity operated filtering water collection tank and filtering system of claim 3 in which the filter material comprises a metallic screen.

8. A gravity operated filtering water collection structure comprising and having within:
  a water accumulation chamber configured for storage of water;
  a first sub-chamber configured with an arcuate wall and structured to accept water arising from outside the water collection structure;
  a second sub-chamber having a deflection wall and said second sub-chamber being disposed in axial relation to and open to the first sub-chamber so as to be configured to accept water from the first sub-chamber, the gravity operated filtering water collection structure further comprising a filter is disposed at least in part into the second sub-chamber and the filter having open first and second ends and a filtering wall comprised of filter material with the first end being open to and disposed for acceptance of water from the first sub-chamber and the second end being disposed in relation to the water collection structure and an exit conduit so that water existing from the second end of the filter flows to the exit conduit while water that passes through the filtering wall passes into the water accumulation chamber.

9. The gravity operated filtering water collection structure of claim 8 further comprising an accessory chamber disposed adjacent to a floor of the water collectioi structure.

10. The gravity operated filtering water collection structure of claim 8 in which the filter is configured in relation to the second sub-chamber and a deflection wall of the second sub-chamber to pass to the exit conduit, water that is debris-laden and pass to the deflection wall, water from which the amount of debris has been reduced.

11. The gravity operated filtering water collection structure of claim 8 in which the first sub-chamber is bowl shaped.

* * * * *